US007407296B2

(12) United States Patent
Stahl et al.

(10) Patent No.: US 7,407,296 B2
(45) Date of Patent: Aug. 5, 2008

(54) INTEGRATED LIGHT GATHERING REFLECTOR AND OPTICAL ELEMENT HOLDER

(75) Inventors: Kurt A. Stahl, Portland, OR (US); Brian G. Russell, Portland, OR (US)

(73) Assignee: InFocus Corporation, Wilsonville, OR (US)

(*) Notice: Subject to any disclaimer, the term of this patent is extended or adjusted under 35 U.S.C. 154(b) by 372 days.

(21) Appl. No.: 11/149,940

(22) Filed: Jun. 10, 2005

(65) Prior Publication Data

US 2006/0279714 A1 Dec. 14, 2006

(51) Int. Cl.
*G03B 21/20* (2006.01)
*G03B 21/14* (2006.01)
*F21V 17/04* (2006.01)
*G02B 6/00* (2006.01)

(52) U.S. Cl. .................. 353/119; 353/102; 362/581; 349/58; 349/62

(58) Field of Classification Search .................. 353/119, 353/97, 100, 84, 102; 359/888, 887, 891, 359/892; 348/742, 743; 362/560, 561, 296–311, 362/341–353, 360, 361, 362, 364–367, 372–375, 362/580–582, 509–511, 516, 546–549, 255, 362/256; 349/58, 62
See application file for complete search history.

(56) References Cited

U.S. PATENT DOCUMENTS

| 6,575,603 | B2 | 6/2003 | Stahl et al. |
| 6,840,633 | B2 * | 1/2005 | Davis et al. .................. 353/98 |
| 7,046,897 | B2 * | 5/2006 | Haggerty et al. ............ 385/133 |
| 7,180,557 | B2 * | 2/2007 | Shimizu ........................ 349/5 |
| 2003/0223047 | A1 * | 12/2003 | Fujimori ...................... 353/31 |
| 2004/0036967 | A1 | 2/2004 | Haggerty et al. |
| 2004/0189958 | A1 * | 9/2004 | Lee ............................ 353/101 |
| 2005/0001942 | A1 | 1/2005 | Shimizu |
| 2005/0046981 | A1 | 3/2005 | Karube et al. |
| 2005/0162622 | A1 * | 7/2005 | Esterberg et al. ............. 353/84 |

OTHER PUBLICATIONS

ISA U.S., International Search Report of PCT/US2006/022620, Jun. 10, 2008, WIPO.

* cited by examiner

*Primary Examiner*—Andrew T Sever
(74) *Attorney, Agent, or Firm*—Alleman Hall McCoy Russell & Tuttle, LLP

(57) ABSTRACT

An integrated light gathering reflector and optical element holder for a projection device includes opposing first and second members. Each of the first and second members define a light gathering reflector portion and an optical element holder portion. The shape of the first member is substantially identical to a shape of the second member.

22 Claims, 5 Drawing Sheets

INTEGRATED LIGHT GATHERING REFLECTOR AND OPTICAL ELEMENT HOLDER

TECHENICAL FIELD

This application pertains to the field of projection systems, and more particularly, to the field of mechanical coupling of projection system components.

BACKGROUND

Today's data and video projection systems typically include illumination systems that may include a number of components, such as light gathering reflectors, cover glass holders, various lens holders, color wheel shrouds, integration or integrating tunnels, etc. These components are generally discrete components which may require additional parts for mounting and alignment. Some challenges faced with such illumination systems may include increased costs due to large part counts, difficulties containing stray light, difficulties in properly aligning the various optical elements, and difficulties in providing adequate thermal dissipation.

SUMMARY

An apparatus including a light gathering reflector is provided. The apparatus further may include an optical element holder integrated into an assembly with the light gathering reflector, where the assembly includes a first half and a second half. In some embodiments, the first and second halves may be substantially identical.

BREIF DESCRIPTION OF THE DRAWINGS

Figure 1:
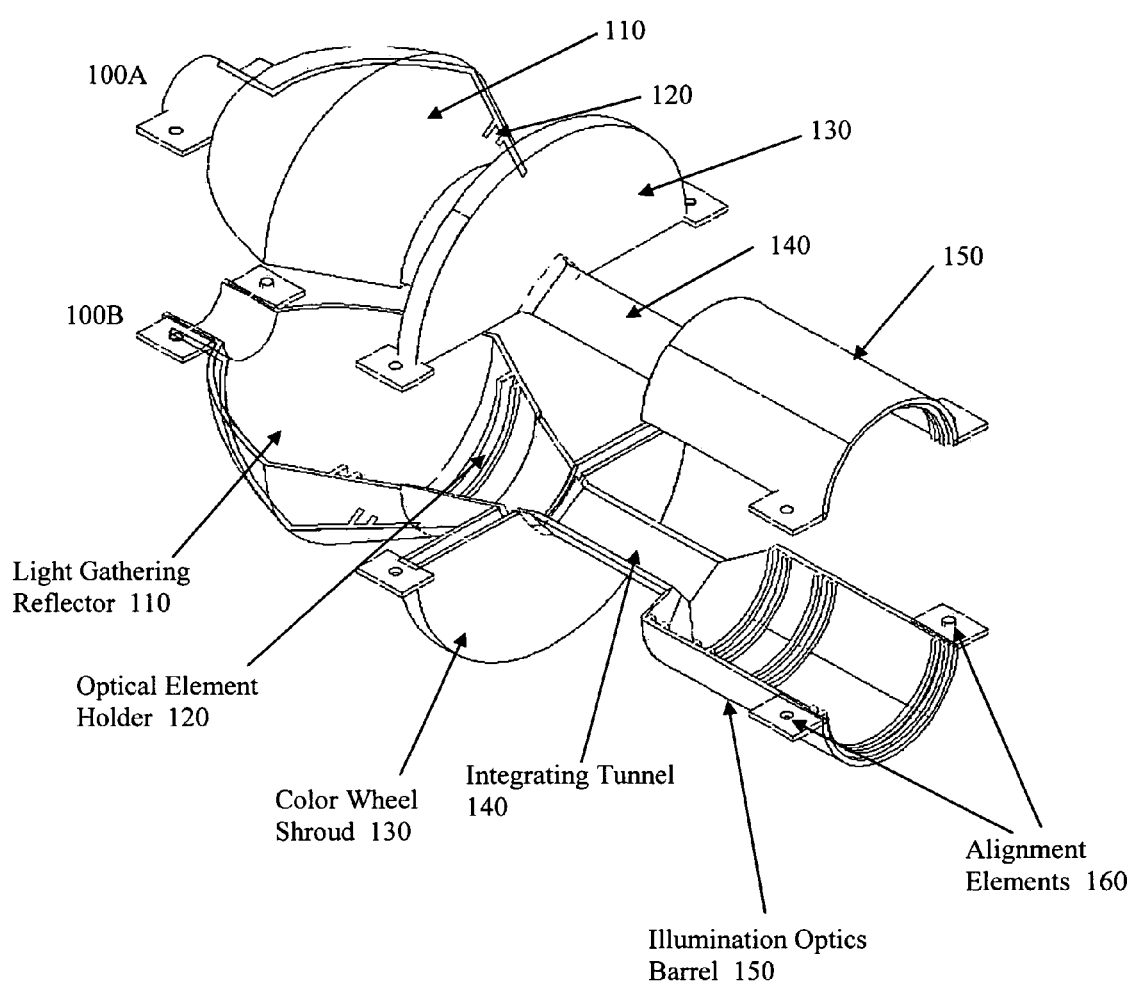
Figure 2:
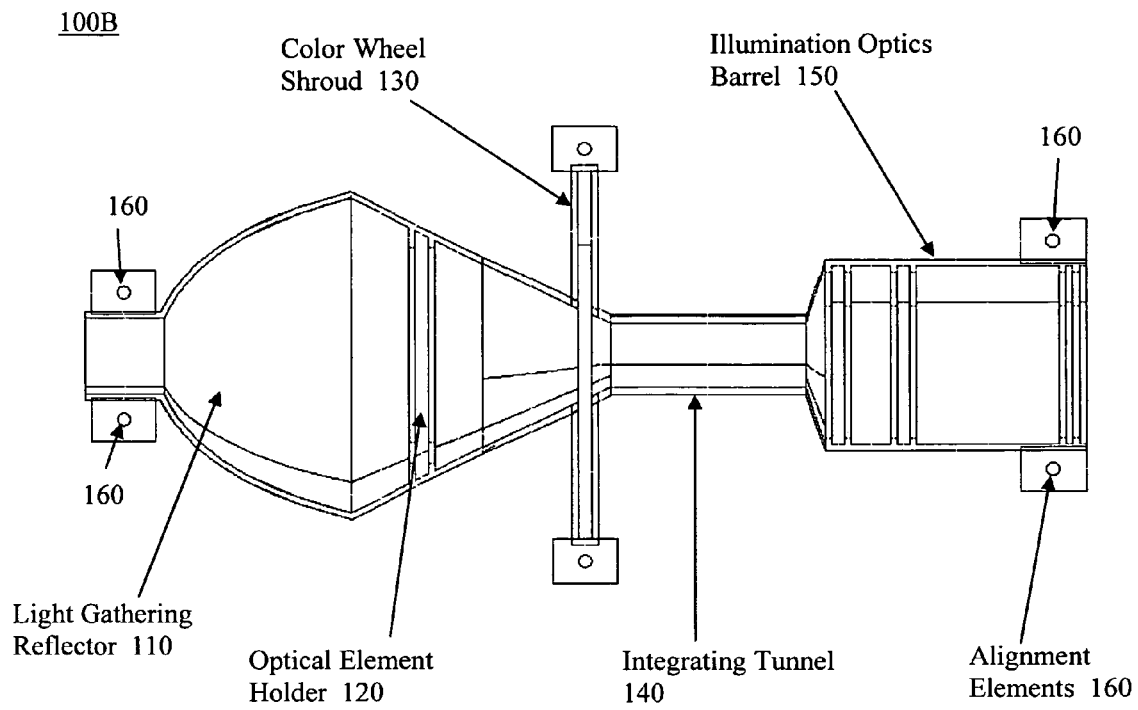
Figure 3:
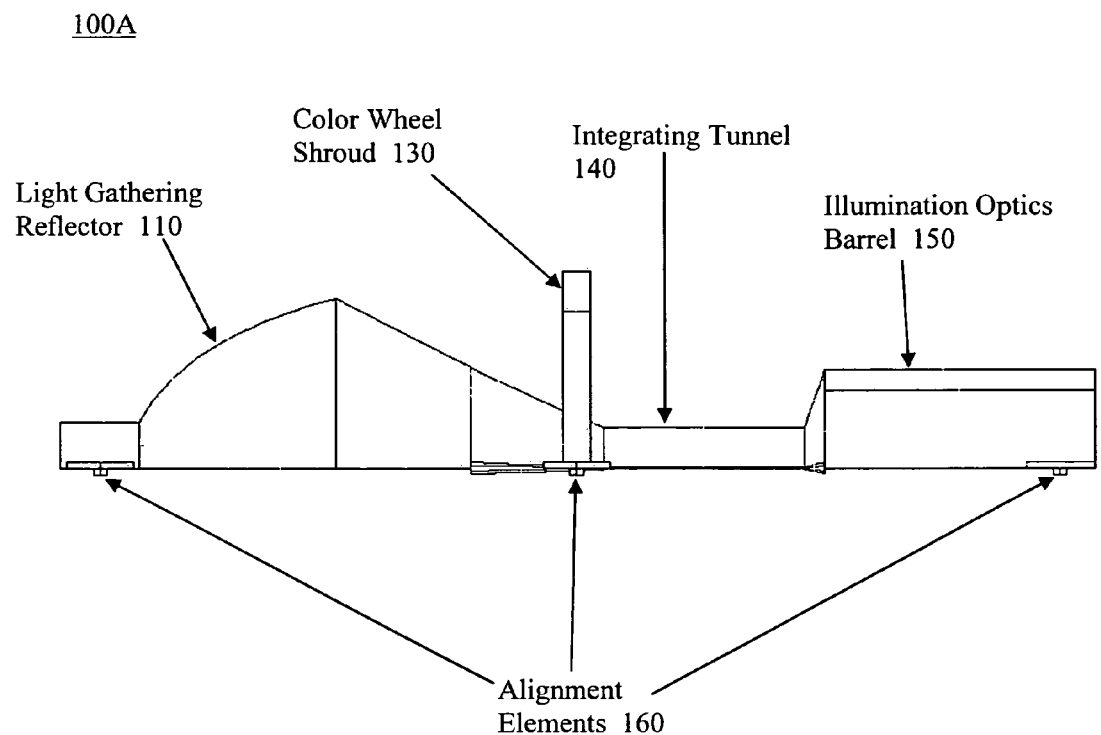
Figure 4:
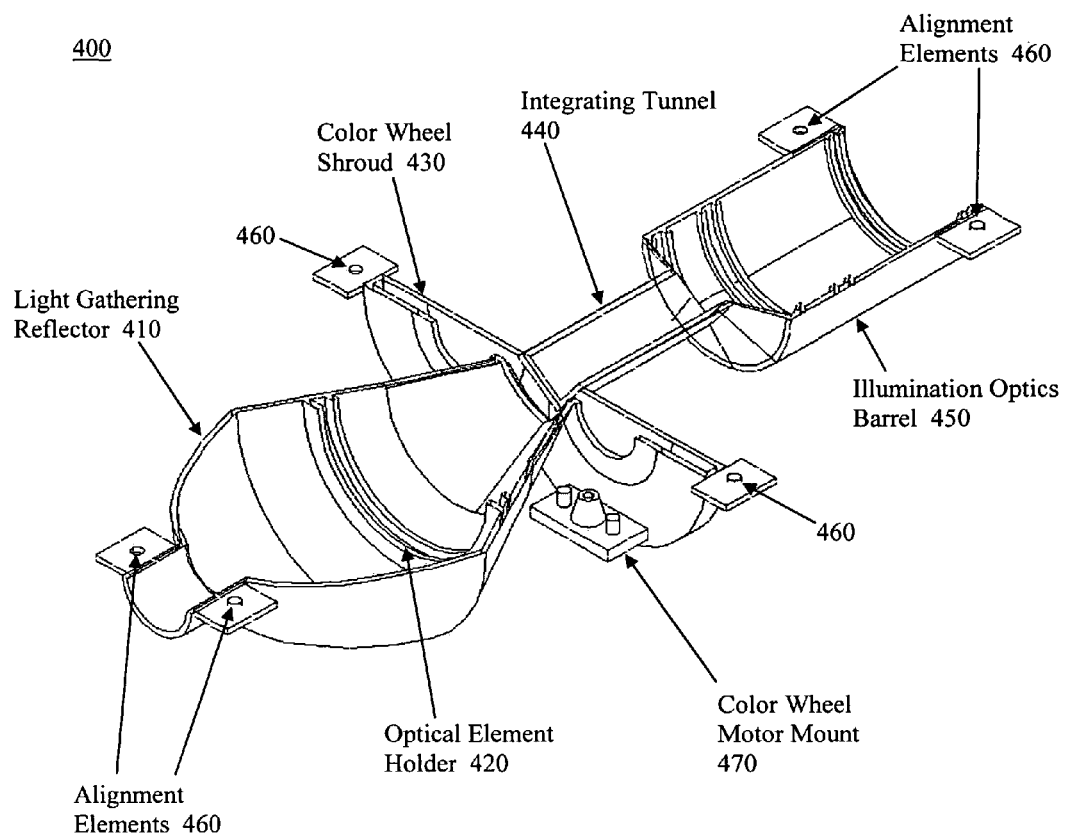
Figure 5A:
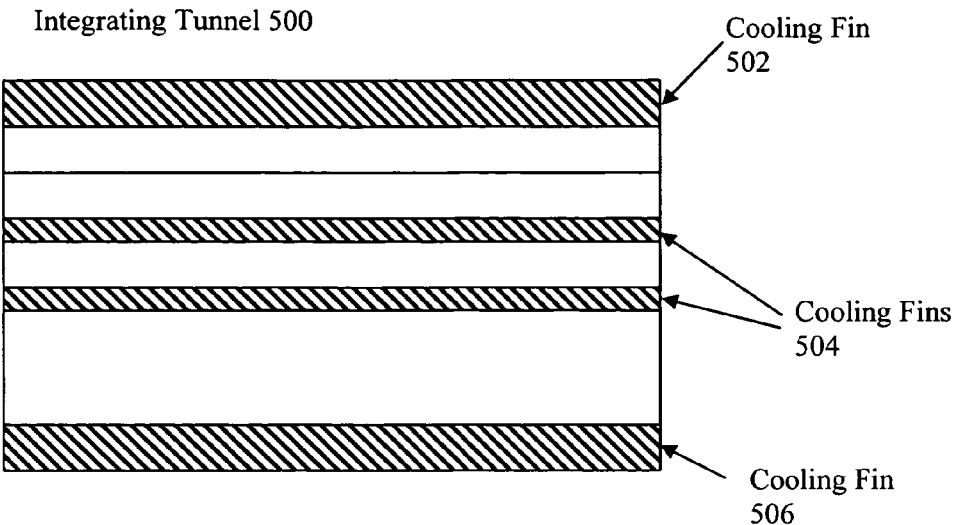
Figure 5B:
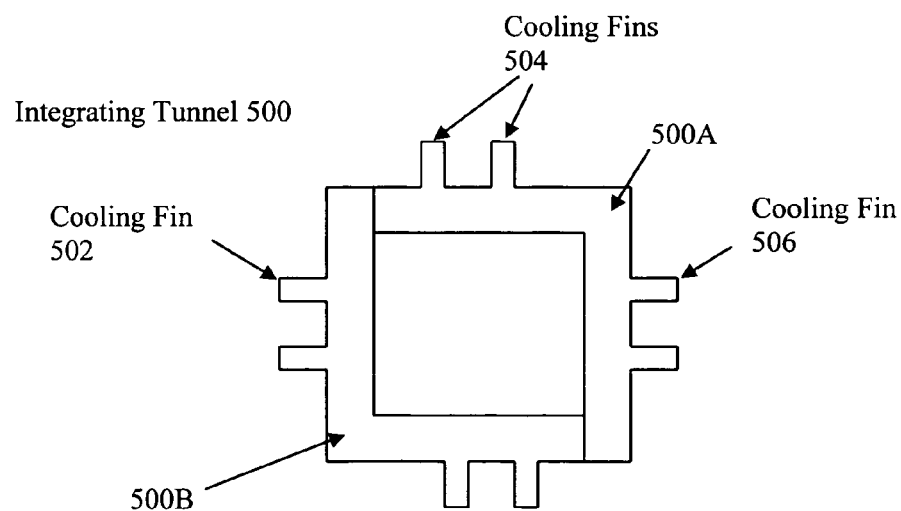

The claimed subject matter will be understood more fully from the detailed description given below and from the accompanying drawings of embodiments which, however, should not be taken to limit the claimed subject matter to the specific embodiments described, but are for explanation and understanding only. FIG. 1 is perspective view of one embodiment of an example illumination system including two clamshell halves. FIG. 2 is top view of one of the example clamshell halves shown in FIG. 1. FIG. 3 is a side view of one of the example clamshell half of an example FIG. 1 FIG. 4 is a perspective view of one clamshell half of an example illumination system including a color wheel motor mount. FIG. 5a is a top view of an integration tunnel portion of an example illumination system including cooling fins. FIG. 5b is a cross-sectional view of the integration tunnel including cooling fins shown in FIG. 5a.

DETAILED DESCRIPTION OF DEPICTED EMBODIMENTS

An illumination system and method is described herein. The illumination system may be incorporated within a projection device. In some embodiments, the projection device may be a projector or image-generation device that is able to project an image onto a display surface, including, but not limited to, a screen, a wall, or other viewing surface ore area. As used herein, a projection device or image-generating device may include any suitable display device or image projector, including, but not limited to, a digital projector, a liquid crystal display (LCD) projector, a digital light processing projector, a rear projection device, a front projection device, etc.

In its most basic form, a projection device may include a light source (or lamp) and an illumination system. The light source may be adapted to produce a beam of light and project the light towards the illumination system. In some embodiments, the light source includes a lamp that is configured to direct most of the emitted light along an optical path of the system. The light source may include any suitable type of lamp. Examples include, but are not limited to, metal halide lamps and ultra-high-pressure (UHP) arc lamps, light emitting diodes (LEDs), ect. the system also may include one or more filters, such as an infrared (IR) or ultraviolet (UV) filter, to filter out unwanted parts of the emission spectra of the lamp, or otherwise filter the light produced from the lamp.

The illumination system may include a number of components, including, but not limited to, light gathering reflectors, cover glass holders, lens holders, color wheel shrouds, integration or integrating tunnels. Further coupled or included with the illumination system may be various optical components including filters, color wheels, lenses, mirrors, integrators, condensers, and other optical elements. Light produced from the light source may be channeled through the illumination system.

FIG. 1 is pers0pective view of one embodiment of an example illumination system 100. Illumination system 100 may include integrated illumination system sections. For ex ample, as shown, illumination system 100 may include two illumination system sections, such as two clamshell halves. The top half is labeled 100A and the bottom half is labeled 100B. For this example embodiment, illumination system 100 includes a light gathering reflector 110, an optical element holder 120, a color wheel shroud 130, an integration tunnel 140, an illumination optics barrel 150. and alignment elements 160. Optical element holder 120 and illumination optics barrel 150 may be used to hold various lenses or other optical or illumination components. Additionally, illumination system may include different features or combination of features then show with illumination system, 100 without departing from the scope of the disclosure.

Of course, many other variations are possible using different combinations of illuminations system components. The example system 100 is merely one among many possible embodiments. For example, the illumination system may include three, four or more illumination sections. Further, the illumination sections may be of any suitable shape, Further, although the illumination sections of FIG. 1 are shown to be substantially identical in size, it should be appreciated that the illumination sections may be different sized, for example in a two section system, one section may be substantially larger than another section. Additionally, in a three section systems, the sections may be identically sized or different sized. The illumination sections may enable the various features of the illumination system to be integrated.

For this example embodiment, two halves 100A and 100B may be formed using a single tool, and as a result may be substantially identical. Alignment elements 160 provide means for aligning the two halves and for helping to mate the two halves together. Any suitable alignment mechanism may be used as alignment elements 160; for example, alignment elements may include detents, fingers, tabs, protrusions, etc. The alignment elements shown in this example embodiment are only one of a wide range of possible alignment or mating features that could be implemented in other embodiments. Further, a clamping mechanism, alone or in combination with alignment elements may be used to align the system.

The integrated illumination system 100 may be formed of metal, such as thixomolded magnesium or die-cast aluminum. Other embodiments may make use of other materials, including but not limited to molded ceramic, glass, or higher temperature plastics (aluminum and magnesium).

In some embodiments, one or more surfaces of the illumination system may be treated. For example, an optical reflective coating may be applied to some of the optical reflecting surfaces of the illumination system, such as the interior surfaces of light gathering reflector 110 and/or integration tunnel 140. In some embodiments, polishing of the optical surfaces may be performed prior to the application of the reflective coating. thus, in some embodiments, no masking would be required for the process of applying the reflective coating because the non-optical surfaces are not harmed by the reflective coating.

Although not shown in this example, cooling features may be incorporated into the integrated illumination system 100. See the discussion below in connection with FIGS. 5*a* and 5*b* for an example where cooling fins are added to the integration tunnel portion of an integrated illumination system. It should be appreciated that other thermal dissipation features may be provided, including various fin structures, venting structures, etc.

The illumination system of the present disclosure may substantially reduce costs of manufacturing the system. Specifically, with the integrated illumination system, there is a lower part count, thus reducing part costs and manufacturing steps. For example, in the integrated illumination system, the number of discrete components is significantly reduced, thus avoiding the necessity of aligning and mounting each discrete component relative to the system and to each other. Moreover, mounting the discrete components may require additional mounting hardware. In contrast, the integrated illumination system provides for a simple, one step alignment process and a reduction in mounting hardware. For example, the system may be configured such that there is inherent alignment of the integration tunnel to the light gathering reflector, as well as, alignment of other optical and/or mechanical components housed within the illumination system.

Additionally, the integrated illumination system provides a system and method for integrating preciously discrete components, into a single assembly. For example, the illumination system may be configured to integrate a number of components, such as a light gathering reflector and an integration tunnel into an assembly that may be formed using a single tool. External features such as cooling fins or heat sinks may also be included on the assembly using the single tool.

Further, the integrated illumination system may reduce thermal load on the face of the integration tunnel and provide improved thermal dissipation. Moreover, the integrated illumination system may improve stray light containment and generally reduce the amount of stray light.

FIG. 2 is top view of one of the example clamshell halves, e.g. 100B shown in FIG. 1. Half 100B includes light gathering reflector 110, optical element holder 120, color wheel shroud 130, integration tunnel 140, illumination optics barrel 150, and alignment elements 160. Again, it is noted that other embodiments may include additional features, combination of features, etc. without departing from the scope of the disclosure.

FIG. 3 is a side view of one of the example clamshell halves 100A shown in FIG. 1. Half 100A includes light gathering reflector 110, optical element holder 120 (not shown), color wheel shroud 130, integration tunnel 140, illumination optics barrel 150, and alignment elements 160.

FIG. 4 is a perspective view of one clamshell half 400 of an example illumination system including a color wheel motor mount 470. the example color wheel motor mount shown in this example embodiment is merely one possible way to incorporate a motor mount. the clamshell half that incorporates a motor mount may be formed using a separate tool from the clamshell half that does not incorporate a motor mount. Other embodiments may use a single tool to produce both halves of the assembly. In this case, both halves may incorporate motor mounts. Other embodiments may attach a discrete motor mount to a single tool, clamshell type assembly such as that shown in FIG. 1.

FIG. 5*a* is a top view of an integration tunnel portion 500 of an example illumination system including cooling fins. The cooling fins are represented by the crosshatched areas labeled 502, 504, and 506. the fins may substantially envelope the integration tunnel portion or be disposed on only a portion of the integration tunnel portion. It should be appreciated that the cooling fins may be of any suitable shape to dissipate heat from the system. For example, cooling fins 502. 504, 506 may be ribs, fins, spines, nodules, protrusions, swellings, spikes, etc. The fins may be substantially the same sized or may vary over the area or region.

In some embodiments, cooling fins may be provided on other sections of the illumination system sections. For example, cooling fins (or other suitable structure) may be provided on one or more portions of the light gathering reflector section, indicated as 110, and 410 in FIGS. 1 and 4 respectively. As discussed above, the molded metal reflector enables the inclusion of external features as part of the mold. Such inclusion of features may provide a more efficient thermal dissipation system.

FIG. 5*b* is a cross-sectional view of the integration tunnel 500 including the cooling fins shown in FIG. 5*a*. The integration tunnel 500 may include two halves, labeled 500A and 500B. Incorporated into the two halves are cooling fins 502, 504, and 506. As mentioned above, the integration tunnel may be one part of a larger assembly, perhaps including the various elements shown in FIG. 1. Further, although this example embodiment describes the incorporation of cooling fins, other embodiments may incorporate other cooling features such as heat sinks.

In some embodiments (such as the embodiment shown above), the integration tunnel may be integrated into the illumination system sections. However, it is noted that in some embodiments, the integration tunnel may be a separate assembly then the illumination system. For example, the integration tunnel with integrated cooling fins may be discrete from the illumination system sections. For example, the discrete integration tunnel may be a molded glass assemble with integrated cooling fins. The single assembly integration tunnel may be used in a different types of illumination systems and may reduce costs of bluing multiple glass pieces together to form an integration tunnel.

Reference on the specification to "an embodiment," "some embodiments," or "other embodiments" means that a particular feature, structure, or characteristic described in connection with the embodiments is included in at least some embodiments, but not necessarily all embodiments. the various appearances of "an embodiment," "one embodiment," or "some embodiments" are not necessarily all referring to the same embodiments.

In the forgoing specification the claimed subject matter has been described with reference to specific example embodiments thereof. It will, however, be evident that various modifications and changes may be made thereto without departing from the broader spirit and scope of the subject matter as set forth in the appended claims. The specification and drawings are, accordingly, to be regarded in an illustrative rather that in a restrictive sense.

What is claimed is:

1. An apparatus, comprising:
an assembly including a first member and a second member, each of the first and second members defining:
a light gathering reflector portion; and
an optical element holder portion, where a shape of the first member is substantially identical to a shape of the second member.

2. The apparatus of claim 1, wherein each of the first and second members of the assembly is formed of metal.

3. The apparatus of claim 2, wherein each of the first and second members of the assembly is formed at least partially of one of magnesium and aluminum.

4. The apparatus of claim 2, wherein an interior surface of each light gathering reflector portion is at least partially covered with a reflective coating.

5. The apparatus of claim 1, wherein each of the first and second members of the assembly is formed of one of molded ceramic or glass.

6. The apparatus of claim 1, wherein the first member includes one or more alignment elements corresponding to alignment elements of the second member.

7. The apparatus of claim 1, wherein the first and second members cooperatively define an integrated integration tunnel.

8. The apparatus of claim 7, wherein an interior surface of the first and second members are configured such that an interior surface of the integration tunnel is at least partially covered with a reflective coating.

9. The apparatus of claim 7, wherein an exterior surface of the first and second members are shaped such that an exterior surface of the integration tunnel includes a cooling fin.

10. The apparatus of claim 1, wherein the first and second members cooperatively define a color wheel shroud.

11. The apparatus of claim 1, wherein the assembly collectively defines an exterior surface having a frustal conical segment.

12. A method of manufacturing an integrated light gathering and optical element holder assembly, the method comprising:
forming a first half of an assembly using a first tool, the first half of the assembly including a light gathering reflector portion and an optical element holder portion; and
forming a second half of the assembly using the first tool, second half of the assembly including a light gathering reflector portion and an a optical element holder portion, wherein a shape of the first half of the assembly is substantially identical to a shape of the second half of the assembly.

13. The method of claim 12, wherein the first and second halves of the assembly cooperatively define an integration tunnel.

14. The method of claim 13, further comprising coating an interior surface of the integration tunnel with a reflective material.

15. The method of claim 12, wherein forming a first half of an assembly includes forming the first half of the assembly at least partially from metal.

16. The method of claim 12, wherein forming a first half of an assembly includes forming the first half of the assembly at least partially from magnesium.

17. The method of claim 12, wherein forming a first half of an assembly includes forming the first half of the assembly at least partially from aluminum.

18. The method of claim 12, wherein forming at least one of the first half of the assembly and the second half of the assembly includes forming at least one of the first half of the assembly and the second half of the assembly at least partially from molded ceramic or glass.

19. The method of claim 12, further comprising coating an interior surface of the light gathering reflector portion of each of the first half and the second half with a reflective material.

20. The method of claim 12, wherein forming a first half of the assembly includes forming cooling fins on an exterior surface of the first half of the assembly.

21. The method of claim 20, wherein forming cooling fins includes forming cooling fins proximate to at least one of the integration tunnel and the light gathering reflector portions of the first and second halves of the assembly.

22. An integrated assembly for a projection system comprising:
a first one-piece member and a second one-piece member, wherein a shape of the first one-piece member is substantially identical to a shape of the second one-piece member, and wherein the first and second one-piece members cooperatively define:
an integration tunnel; and
a plurality of cooling fins at exterior surfaces of the first and second one-piece members proximate to the integration tunnel.

* * * * *

UNITED STATES PATENT AND TRADEMARK OFFICE
CERTIFICATE OF CORRECTION

| | |
|---|---|
| PATENT NO. | : 7,407,296 B2 |
| APPLICATION NO. | : 11/149940 |
| DATED | : August 5, 2008 |
| INVENTOR(S) | : Kurt A. Stahl and Brian G. Russell |

It is certified that error appears in the above-identified patent and that said Letters Patent is hereby corrected as shown below:

In column 1, line 61, delete "ore" and insert --or-- therefor.

In column 2, line 10, delete "ect." and insert --etc.-- therefor.

In column 2, line 10, delete "the" and insert --The-- therefor.

In column 2, line 23, delete "pers0pective" and insert --perspective-- therefor.

In column 2, line 44, delete "shape," and insert --shape.-- therefor.

In column 3, line 10, delete "thus" and insert --Thus-- therefor.

In column 3, line 66, delete "the" and insert --The-- therefor.

In column 4, line 1, delete "the" and insert --The-- therefor.

In column 4, line 12, delete "the fins" and insert --The fins-- therefor.

In column 4, line 16, delete "502." and insert --502,-- therefor.

In column 4, line 56, delete "the" and insert --The-- therefor.

In column 4, line 66, delete "that" and insert --than-- therefor.

Signed and Sealed this

Twenty-third Day of September, 2008

JON W. DUDAS
*Director of the United States Patent and Trademark Office*